United States Patent [19]
Bunney

[11] Patent Number: 5,217,106
[45] Date of Patent: Jun. 8, 1993

[54] OSCILLATING LOG UNSCRAMBLER

[76] Inventor: Leroy R. Bunney, P.O. Box 1081, Everett, Wash. 98206

[21] Appl. No.: 792,689

[22] Filed: Nov. 15, 1991

[51] Int. Cl.⁵ .................. B65G 25/00; B65G 47/04
[52] U.S. Cl. ........................ 198/463.5; 198/443; 414/746.2; 221/241
[58] Field of Search ............... 198/443, 463.5, 463.6; 414/745.1, 745.9, 746.2, 746.4; 221/238, 241, 251, 268, 271, 272

[56] References Cited

U.S. PATENT DOCUMENTS

| | | | |
|---|---|---|---|
| 3,118,546 | 1/1964 | McConnell et al. | 414/746.2 |
| 3,306,472 | 2/1967 | Blanz | 221/241 X |
| 3,655,067 | 4/1972 | White | 414/746.2 |
| 4,431,367 | 2/1984 | Pousette et al. | 221/238 X |
| 4,930,616 | 6/1990 | Lindberg | 221/251 X |

FOREIGN PATENT DOCUMENTS 205128 10/1965 Sweden.
747793 7/1980 U.S.S.R..

Primary Examiner—Robert P. Olszewski
Assistant Examiner—Dean A. Reichard
Attorney, Agent, or Firm—Mark Zovko

[57] ABSTRACT

Apparatus for separating logs singularly or in a single layer to down-stream processing equipment such as a debarker. The apparatus includes an oscillating drum segment which has a log pocket thereon. The log pocket is initially located adjacent the log bundle and as oscillation of the apparatus begins, the notch collects a log and transports it to a second position wherein the gravity discharge of the log to a point downstream occurs. The drum segment is then rotated in the opposite direction to its initial position and the procedure repeated. Bars are provided which fit within guide pockets in the drum. Bars fit within guide pockets in the drum. The upper surface of the bars act as a receiving ramp for the log as it is discharged from the drum. In the preferred embodiment, the drum segment can be adjusted radially thereby varying the capacity of the log pocket.

4 Claims, 4 Drawing Sheets

OSCILLATING LOG UNSCRAMBLER

FIELD OF THE INVENTION

The invention relates in general to log handling apparatus and more particularly to an oscillating log unscrambler used to separate logs singularly or in a single layer from a scrambled log bundle.

BACKGROUND OF THE INVENTION

Characteristically, bundles of logs are placed on a series of transfer chains running in substantially parallel lines. The bundle is conveyed along the chains to a stop and loader, for example, which, theoretically feeds individual logs to a debarker. However, the large bundle of logs often makes it difficult for the loader to function properly. Sometimes the loader is unable to tip a log or it tips more than one log at a time onto the debarker conveyor. Therefore, there is particular need for a system which will ensure entry of a single log or a single layer of logs into the stop and loader so that a single log may be reliably entered into the debarker. Debarking is not the only operation where isolating a single log from a bundle is important; in fact, in most log processing, separation and isolation of each log or separation into a single layer is necessary. A typical prior art solution to the problem is shown in U.S. Pat. No. 4,852,716 issued to Roche.

A recent patent search has produced the following patents which may be of interest:

| U.S. Pat. No. | Inventor |
| --- | --- |
| 3,118,546 | McConnell, et al |
| 3,306,472 | Blanz |
| 3,655,067 | White |
| 3,700,116 | Rysti |
| 4,431,367 | Pousette, et al |
| 4,624,361 | Hollins |
| 4,930,616 | Kindberg |

In general, these patents show oscillating movement in the handling of logs or other elongated objects. None of these patents, however, show the structure and function of the present invention. For example, U.S. Pat. No. 3,700,116 issued to Rysti shows a log handling device which includes a pair of operatively associated lifters which function differently than the present invention. The lifters are alternatively used to provide a threshold which differs significantly from the operation of the present invention. The other devices as mentioned have functional differences which would not allow them to perform the unscrambling process as does the present invention.

SUMMARY OF THE INVENTION

The present invention includes apparatus for separating logs from a bundle and feeding logs singularly or in a single layer to other downstream processing equipment such as a debarker. Typically a bundle of logs is large and somewhat scrambled in that the individual logs are not parallel to each other. The present invention, therefore, can be used to unscramble and singulate a given bundle of logs to facilitate further downstream processing. To accomplish this end, the apparatus includes a drum segment which can be rotated about a longitudinal axis through the drum. The drum has at least one log pocket which can accommodate a log thereon as the drum is caused to rotate. The drum is located with the pocket adjacent to log bundle feeding apparatus. The log feeder is used to transport the bundle of logs to the drum with the drum positioned so that the log pocket can collect one of the logs as the log pocket of the drum rotates past the log feeder. The drum is caused to rotate by a suitable actuating system from a first postion with the log pocket adjacent to the bundle of logs thereby allowing the pocket to collect one of the logs and transport that log as the drum rotates to a second position wherein the gravity discharge of the log from the log pocket occurs. The actuating system then casues rotation of the drum in the opposite direction, returning the drum to this original first position wherein the log pocket is adjacent to the bundle of logs. This above described oscillating movement of the drum continues until the bundle of logs is unscrambled and discharged singularly to a suitable receiver.

In the preferred embodiment of the invention, the apparatus provides a plurality of bars which abutt against the drum segment surface as the log pocket is rotated to the second position previously described wherein the log is discharged by gravity. The bars are spaced longitudinally with respect to the drum and fit within guide pockets of the drum as the drum rotates from the first position to the second position. The bars are also positioned such that logs discharged from the drum are received upon the upper surface of the bars and roll downwardly to a receiver located downstream of the apparatus. Also, in the preferred embodiment the feeder would have a ramp downwardly sloping to the oscillating drum. The drum can be oscillated by a conventional hydraulic piston and cylinder. Further, the drum segment can preferably be adjusted in the radial direction by a second piston and cylinder. Adjustment of the drum segment in the radial direction increases or decreases the depth of the log pocket varying its capacity.

It is therefore an object of the present invention to provide apparatus for unscrambling logs which uses an oscillating type motion.

Another object of the present invention is to provide means for singulating logs from a bundle for further downstream processing.

A further object of the present invention is to provide an improved alternative to conventional log unscrambler.

These and other objects and advantages of the present invention will become more apparent from the following detailed description when taken in conjunction with the accompanying drawings.

DESCRIPTON OF THE PREFERRED EMBODIMENT

Referring to the figures previously described, the present invention includes log singulating apparatus generally designated as 10. The apparatus 10 is located adjacent a conventional log input transferring means such as a plurality of parallel, spaced transfer chains. The input transfer means has a downwardly sloping ramp 14 for feeding logs to apparatus 10. The ramp 14 forms a catch for logs from the log bundle conveyed by the conveying means. The unscrambling apparatus 10 will take the input logs from the bundle and deliver them substantially one at a time to the downstream conveyer 16 which, for example, can convey the unscrambled logs one at a time to conventional debarker (not shown).

Figure 3:
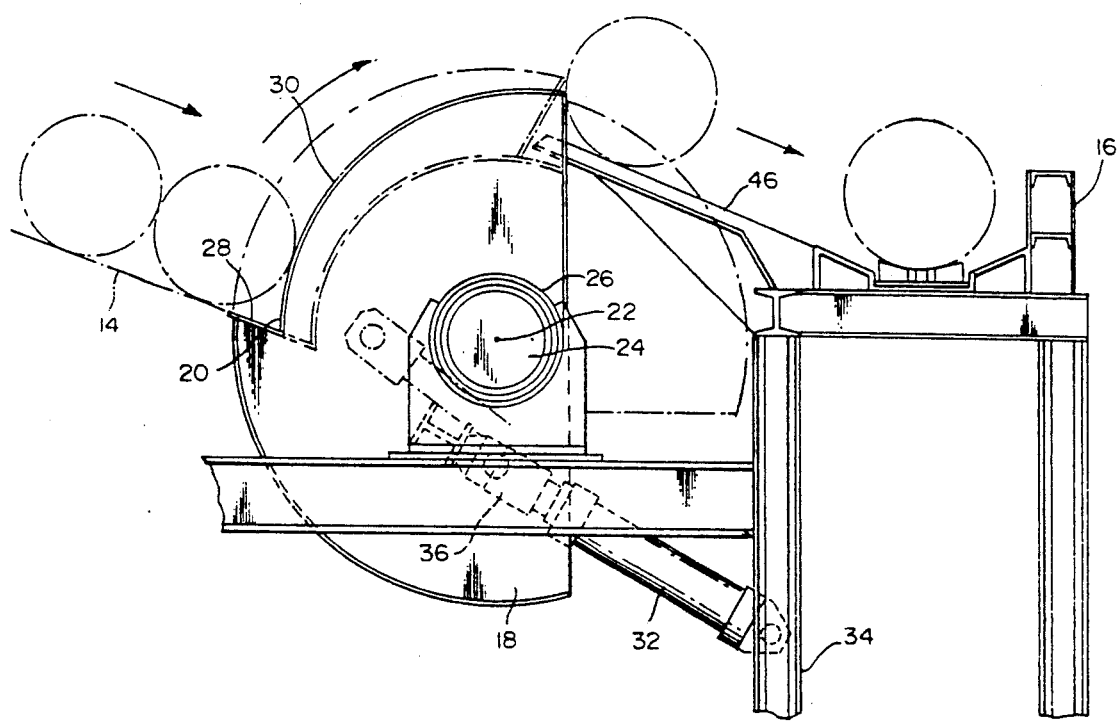
FIG. 3 is a side view of apparatus in accordance with the present invention.

The apparatus 10 has a revolving drum 18 segment having a log pocket designated as 20 therein. The drum 18 rotates about a longitudinal axis 22 through a central shaft 24. A suitable bearing surface 26 is provided between the drum 18 and shaft 24. The log pocket 20 is configured so that it can be said to form an extension of ramp 14 prior to start up as best shown in FIG. 3. The upper surface 28 of the log pocket and the inside surface 30 of drum 18 forms a cradle for holding and transporting a log from the log bundle fed to the apparatus 10. To produce rotation of the drum 18, suitable activation means such as a conventional hydraulic cylinder 32 can be used. One end of hydraulic cylinder 32 can be fixed to the frame 34 of the conveyor 16. The other end of the hydraulic cylinder 32 which includes a piston 36 can be fixed to the drum segment 18. Upon activation of the hydraulic cylinder 32, the piston 36 moves outwardly and causes rotation of drum segment 18. In the figures, drum segment 18 is caused to move from a first position wherein the log pocket 20 is adjacent to the input logs to a second position, approximately ninety degrees from the first position wherein the logs are discharged from the log pocket by gravity to the conveyor 16. Retraction of the piston 36 into hydraulic cylinder 32 reverses this motion moving the log pocket 20 of drum segment 18 from the second position herein described back to the first position. The apparatus 10 is mounted on a suitable frame 44.

Figure 2:
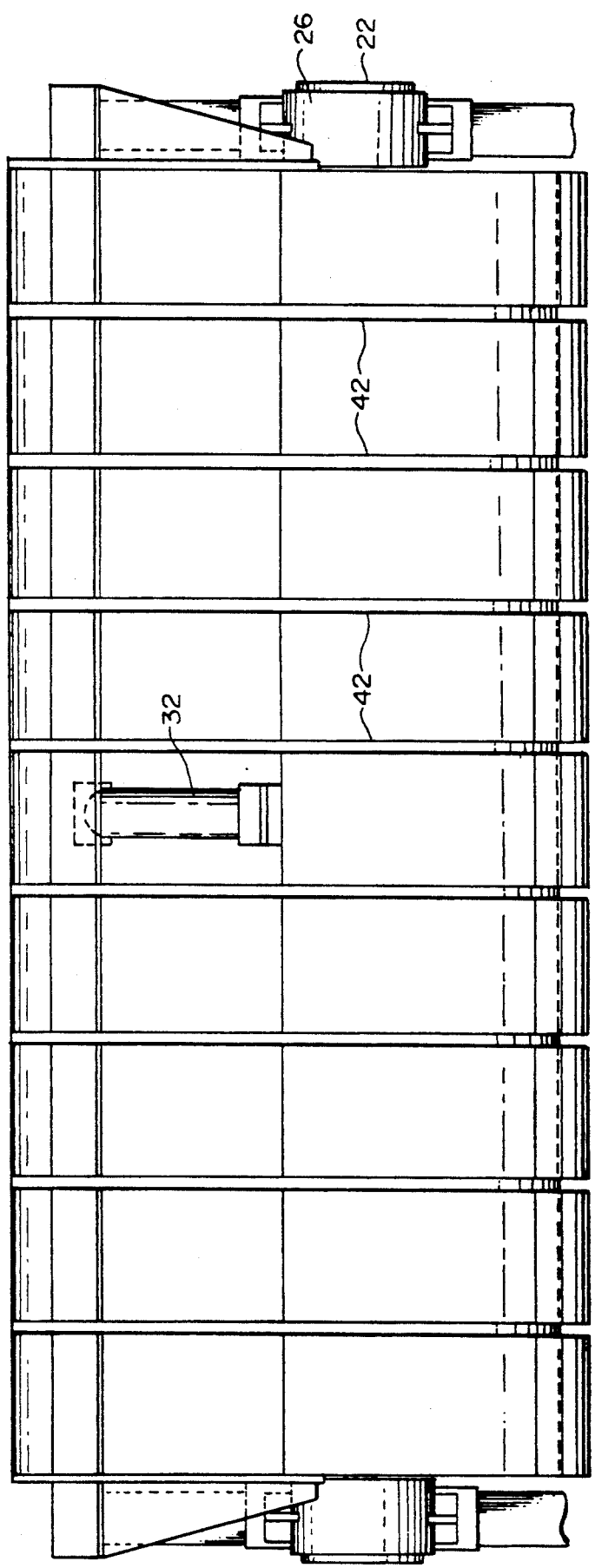
FIG. 2 is a plan view of apparatus in accordance with the present invention.

To limit the rotation of drum 18 and to insure discharge of the logs therefrom, separating means, generally designated as 38, is provided. The separating means 38 includes a plurality of separating bar fingers 40 which contact the upper surface 28 of log pocket 20 when log pocket 20 is moved to the previously described second position. The separating bar fingers 40 are fit within guide pockets 42 along the length of drum 18 as best shown in FIG. 2. As drum segment 18 revolves from the first position, the fingers 40 do not interfere with its rotation. Fingers 40 have an upper surface 46 which slopes downwardly to the downstream conveyor 16. Logs which are discharged from the drum segment 18 are received by the upper surface 46 of the fingers 40 which serve as a ramp to feed conveyor 16.

Log unscrambling presently is not done efficiently with chain unscramblers due to high maintenance costs and excessive wear of the chains. U.S. Pat. No. 4,852,716 shows an alternative to chain unscrambling, i.e., the use of a drum unscrambler. This unscrambler relies on rotary motion of the drum. In the operation of the present invention, an oscillating or reciprocitory motion is used which is more desirable from the maintenance standpoint. To summarize and describe the motion of the unscrambler of the present invention, the following can be said. Logs are delivered to the apparatus 10 from ramp 14 of input transfer means in a bundle. The log bundle slides down ramp 14 which catches the logs. The drum 18 begins with log pocket 20 in a first position with its upper surface 28 forming an extension to ramp 14. The upper surface 28 of the log pocket 20 cradles a log in this position. As the hydraulic cylinder 32 is activated, piston 36 extending from cylinder 32 causes the drum 18 to rotate with a log cradled in the log pocket 20 of drum 18. As the piston 36 extends further, the log is transported to a second position at which point the log is discharged by gravity onto the upper surface 46 of fingers 40 which forms a downwardly sloping ramp to the downstream conveyor 16. Piston 36 is then retracted into hydraulic cylinder 32 resulting in reversal of the rotation of drum 18 back to the original first position with the upper surface 28 of the log pocket 20 lined up with ramp 14. The apparatus 10 of the present invention, therefore, provides an efficient means for feeding logs one at a time from a scrambled bundle to a conveyor using oscillating motion.

ALTERNATIVE EMBODIMENTS

Figure 4:
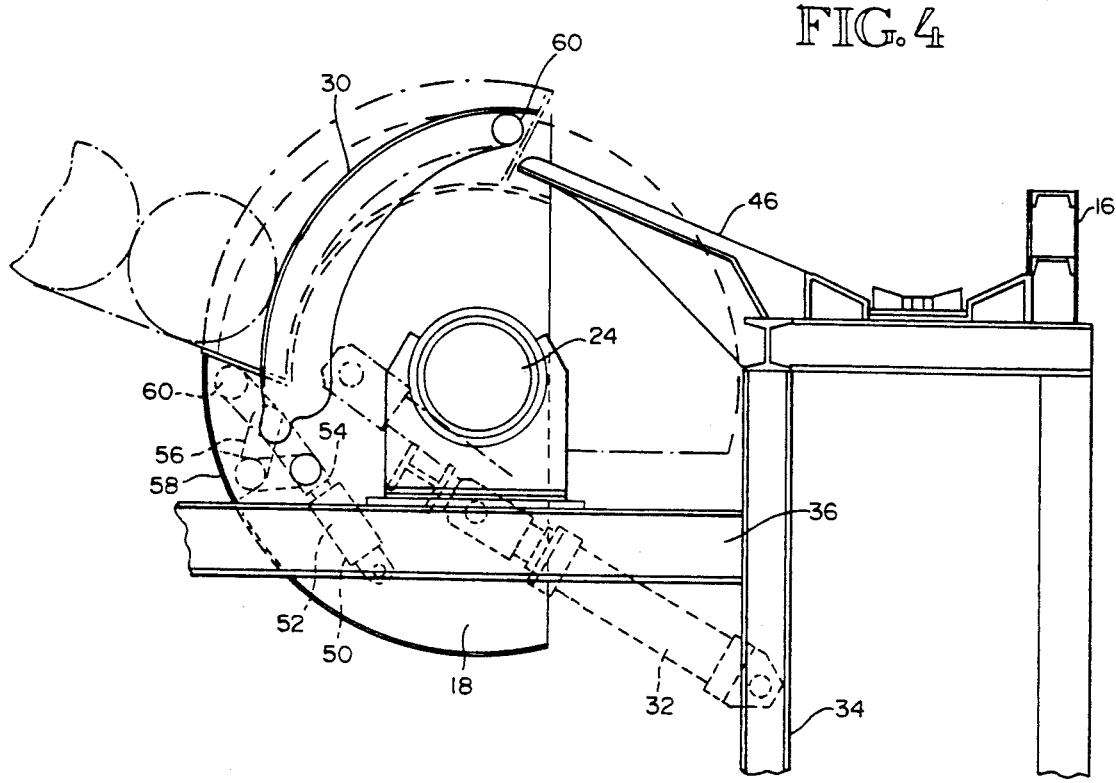
FIG. 4 is a side view of an alternative embodiment of the invention showing the drum segment adjustable in the radial direction.
Figure 5:
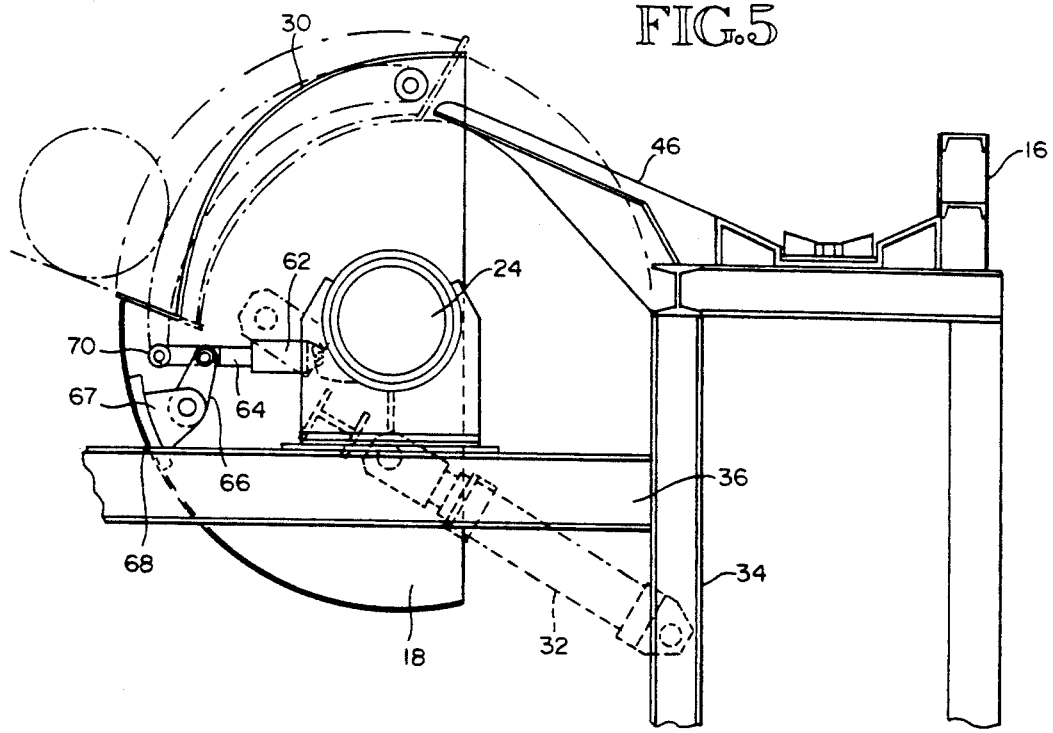
FIG. 5 is a side view of another alternative embodiment of the invention, also showing the drum segment being adjustable in the radial direction.

Referring now to FIGS. 4 and 5, an alternative embodiment of the present invention can be described which includes adjustment of the drum segment 18 in the radial direction. In both FIGS. 4 and 5, the adjustor shown is termed a rotating adjustor which rotates with the drum segment 18 as the drum segment 18 moves from the first position to the second position.

Referring now especially to FIG. 4 which shows the first embodiment of the rotating adjustor, the operation of this adjustor can be described. A hydraulic cylinder designated 50 is used to initiate movement of the inside surface 30 of the drum segment 18 when the piston 52 of that cylinder is extended outward. Cylinder 50 is attached to drum segment 18 and free to rotate as that drum segment moves from the first to the second position. A rod 54 which extends from hydraulic cylinder 50 is connected by connecting segment 56 which connects rod 54 to a bracket 58 which is mounted on the inside surface of the drum segment 18. Connecting segment 56 is rotably mounted to the rod 54 and the bracket 58. At the upper end of rod 54 is bar 60 which abuts against the interior of inside surface 30 of drum segment 18. As hydraulic cyclinder 50 is activated and rod 54 extends farther from the cylinder, the inside surface 30 of drum segment 18 is moved outward radially, thereby diminishing the capacity of the log notch 20. Smaller diameter logs, therefore, can be processed much easier with the radially adjusting feature shown in this figure.

A different rotating adjustor is shown in FIG. 5. In this embodiment a cylinder 62 is shown similar in function and structure to the cylinder 50 of FIG. 4, but mounted to shaft 24 of the apparatus 10. Cylinder 62 has a rod 64 extending therefrom connected at one part to a connecting segment 66 which is rotably connected to a bracket 68 mounted on a bearing pad on the inside face of drum segment 18. Rod 64 is connected at its upper end to a bar 70 which abuts against the interior of the inside surface 30 of drum segment 18. In a manner similar to the apparatus shown in FIG. 4, as the rod 64 is extended from the cylinder, the inside surface 30 of the drum segment 18 is moved outward in the radial direction, diminishing the capacity of the log notch in a manner similar to that described for FIG. 4. As in FIG. 4, the entire adjusting apparatus rotates with the drum segment as it moves from the previously described first position to the second position in which the log held in the log notch is discharged.

Figure 1:
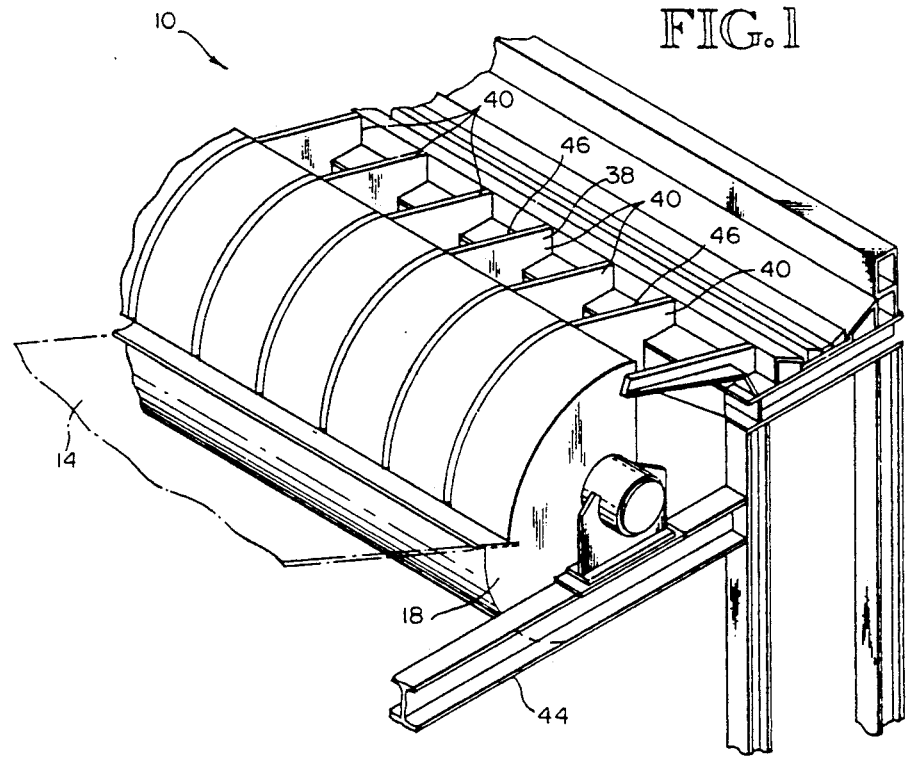
FIG. 1 is a perspective view of the apparatus of the present invention.
Figure 6:
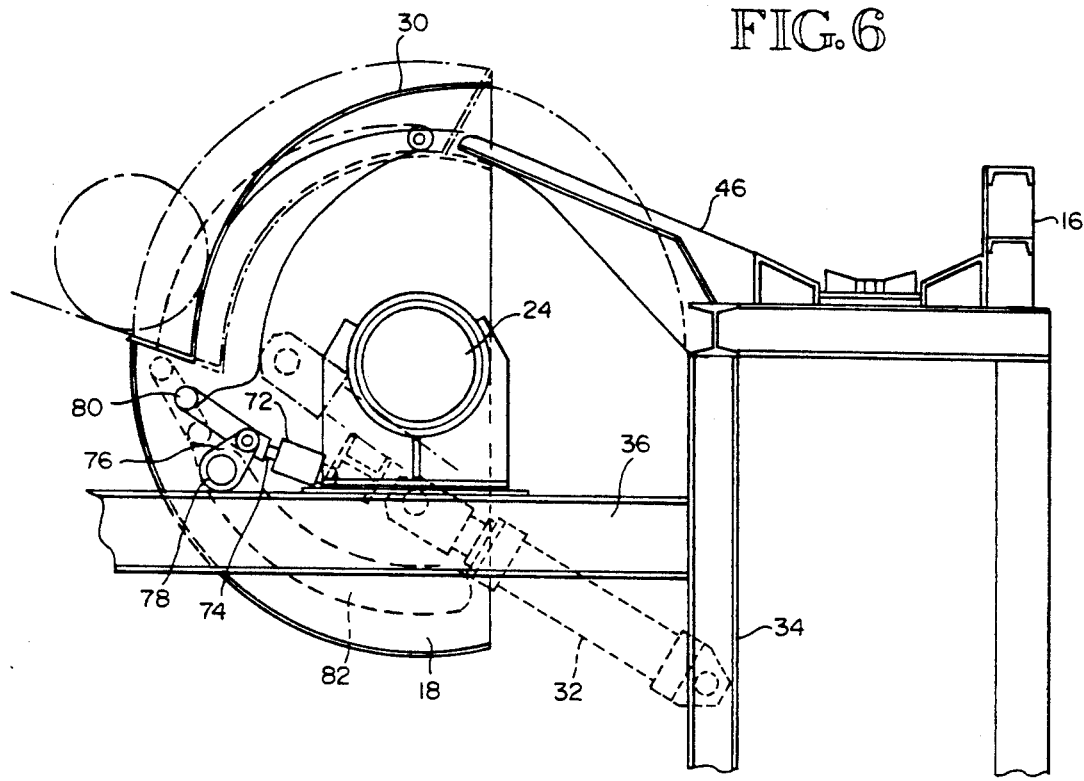
FIG. 6 is a side view showing yet another embodiment of the present invention showing once again the drum segment being adjustable in the radial direction.
Figure 7:
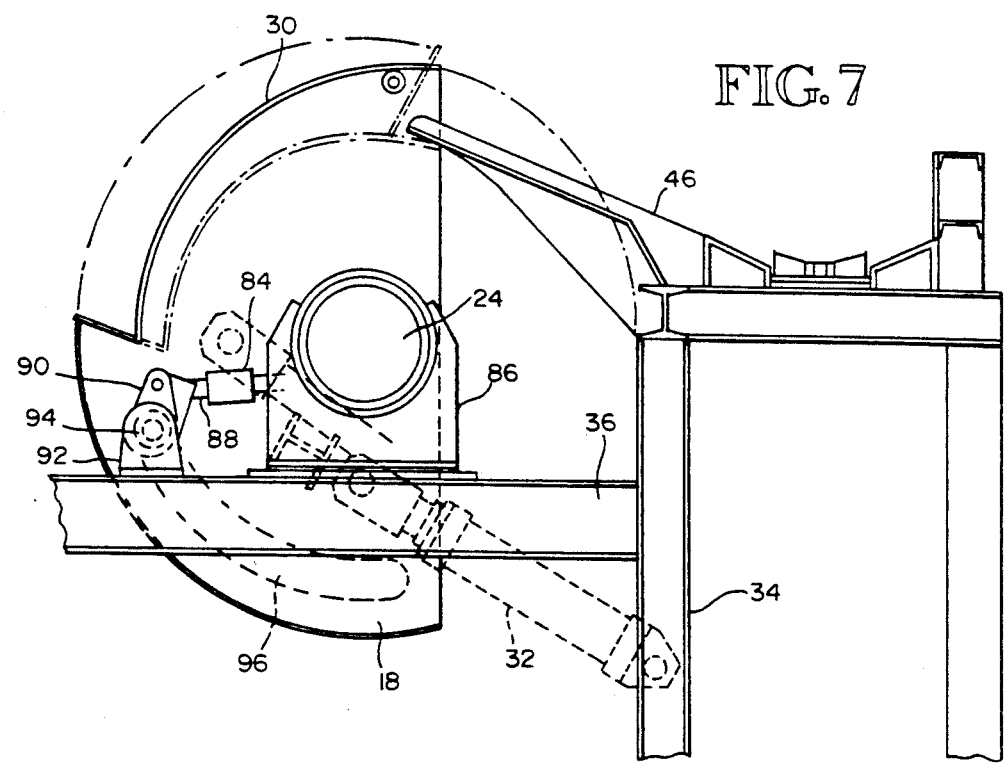
FIG. 7 is a side view showing still another embodiment of the present invention showing the drum segment adjustable in the radial direction.

Referring now to FIGS. 6 and 7, two more alternative embodiments of the invention can be described which have the radially adjusting feature for the inside surface 30 of the drum segment 18. In these embodiments, the adjustor is fixed relative to the rotating drum segment 18. Referring now especially to FIG. 6, a hydraulic cylinder 72 is shown mounted on frame 36 of the apparatus 10. The cylinder 72 has a rod 74 extending therefrom and rotably connected to a connecting segment 76 which is mounted in turn to a bracket 78. Bracket 78 is also mounted to frame 36. The upper end of rod 74 is attached to a bar 80 which abuts against the interior of the inside surface 30 of drum segment 18. To move surface 30 outward radially, the rod can be extended from the cylinder 72. A slot is required which is large enough to allow movement of the drum segment 18 past the adjusting apparatus. Using the slot 82 in the drum segment 18, the adjustor can thereby be fixed and does not have to move with the drum segment 18. FIG. 7 shows an alternative to this fixed adjustor as shown in FIG. 6. In this embodiment the cylinder 84 is mounted to the shaft support 86, outside of the drum segment 18 itself. Rod 88 of the cylinder 84 is connected to a connecting segment 90 which is rotably fastened to a bracket 92 mounted on frame 36. A torque tube 94 runs through the bracket 92 in a longitudinal manner. Movement of rod 88 forces the connecting segment 90 which abuts against the interior of the inside surface 30 of drum segment 18 to extend radially, thereby diminishing the capacity of the log pocket. If rod 88 is retracted, the inside surface 30 of the drum segment 18 moves inward radially, thereby increasing the capacity of the log pocket. As in the embodiment shown in FIG. 6, a suitable slot 98 in drum segment 18 is provided so that the adjusting apparatus tends to remain fixed relative to the drum segment 18 and not interfere as the drum segment moves from the first position to the second position. In all other aspects, the embodiments shown in FIGS. 4,5,6, and 7 are similar to the embodiment shown in FIGS. 1,2, and 3, except for the adjustability of the apparatus in the radial direction, thereby adjusting the capacity of the log notch. It should be noted that the radial adjustability allows use of the apparatus over a wide range of log diameter sizes. This adjustability eliminates the need for duplication of the apparatus for different log sizes.

The invention may be embodied in other forms without departing from the spirit or essential characteristics thereof. The present embodiments are therefore to be considered in all respects as illustrative and not restrictive, the scope of the invention being indicated by the appended claims rather than the foregoing description, and all change which comes within the meaning and range of equivalency of claims is intended to be embraced therein.

I claim:

1. Apparatus for separating logs from a bundle comprising,
   a. a revolving drum segment rotatable about a longitudinal axis thorugh said drum, said drum having at least one log pocket to receive a log, said drum segment having a plurality of guide pockets along its length;
   b. feeding means for feeding a bundle of logs to said drum, said feeding means positioning the logs adjacent to said drum so as to allow said log pocket to collect one of said logs as said log pocket of said drum rotates past said feeding means;
   c. actuating means connected to said drum for causing rotation of said drum from a first position wherein said log pocket is adjacent the bundle of logs thereby allowing said log pocket to collect one of the logs and transport that log as said drum rotates to a second position wherein gravity discharge of the log from said log pocket occurs, said actuating means then causing rotation of said drum in the opposite direction allowing said drum to return to the first position wherein said log pocket is adjacent to the bundle of logs;
   d. receiving means for receiving the log as it is discharged from said log pocket of said drum, said receiving means having a plurality of separating bar fingers which fit within said guide pockets of said drum as said drum rotates from said first position to said second position, said separating bar fingers having an upper surface adapted to receive the log as it is discharged from said log pocket of said drum.

2. The apparatus of claim 1 wherein said feeding means includes a downwardly sloped ramp adjacent said drum.

3. The apparatus of claim 1 wherein said drum segment is adjustable in the radial direction thereby adjusting the capacity of said log pocket.

4. The apparatus of claim 1 wherein said actuating means includes a hydraulic piston and cylinder assembly.

* * * * *